US010257382B2

(12) United States Patent
Yasunaga

(10) Patent No.: US 10,257,382 B2
(45) Date of Patent: Apr. 9, 2019

(54) IMAGE FORMATION CONTROL METHOD, IMAGE FORMING SYSTEM, AND IMAGE FORMING APPARATUS FOR CONTROLLING DATA TRANSFER AMONG A PLURALITY OF COMMUNICATION PATHS

(71) Applicant: Konica Minolta, Inc., Chiyoda-ku, Tokyo (JP)

(72) Inventor: Yutaka Yasunaga, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/414,733

(22) Filed: Jan. 25, 2017

(65) Prior Publication Data
US 2017/0223222 A1    Aug. 3, 2017

(30) Foreign Application Priority Data
Jan. 28, 2016  (JP) .................................. 2016-014648

(51) Int. Cl.
*G06F 3/12* (2006.01)
*H04N 1/333* (2006.01)
(Continued)

(52) U.S. Cl.
CPC ..... *H04N 1/33361* (2013.01); *G06K 15/1836* (2013.01); *H04N 1/00923* (2013.01);
(Continued)

(58) Field of Classification Search
None
See application file for complete search history.

(56) References Cited

U.S. PATENT DOCUMENTS

2002/0024902 A1* 2/2002 Sasaki .................... G11B 19/04
369/47.39
2002/0118383 A1 8/2002 Kamiya
(Continued)

FOREIGN PATENT DOCUMENTS

JP  2001-298563 A  10/2001
JP  2002-247270 A   8/2002
(Continued)

OTHER PUBLICATIONS

First Office Action issued in corresponding Chinese Patent Application No. 201710058400.1, dated Oct. 12, 2018 (15 pages).

*Primary Examiner* — Henok Shiferaw
(74) *Attorney, Agent, or Firm* — Buchanan Ingersoll & Rooney PC

(57) ABSTRACT

An image formation control method for controlling an image forming system including a controller that converts original image data into image formation image data, an image forming apparatus that includes a control unit and an image forming unit and forms an image on a sheet on a basis of the image formation image data, a plurality of communication paths through which plural pieces of data are capable of being transferred in parallel between the controller and the image forming apparatus, and a measurement unit that measures data transfer speed of each of the plurality of communication paths includes causing the control unit to refer to the data transfer speed of each of the plurality of communication paths measured by the measurement unit and to assign a data transfer to each of the plurality of communication paths.

19 Claims, 13 Drawing Sheets

(51) Int. Cl.
*G06K 15/02* (2006.01)
*H04N 1/00* (2006.01)
(52) U.S. Cl.
CPC . *H04N 1/33323* (2013.01); *H04N 2201/3335* (2013.01); *H04N 2201/33378* (2013.01); *H04N 2201/33385* (2013.01)

(56) References Cited

U.S. PATENT DOCUMENTS

| | | | | |
|---|---|---|---|---|
| 2009/0251726 A1* | 10/2009 | Suzue | ............... | H04N 1/00214 358/1.15 |
| 2011/0043850 A1* | 2/2011 | Eun | ............... | H04N 1/32765 358/1.15 |
| 2012/0076022 A1* | 3/2012 | Shibata | ............... | H04L 43/0817 370/252 |
| 2012/0268797 A1* | 10/2012 | Inoue | ............... | H04N 1/33323 358/442 |
| 2014/0168700 A1* | 6/2014 | Araya | ............... | G06F 3/124 358/1.15 |

FOREIGN PATENT DOCUMENTS

| | | |
|---|---|---|
| JP | 2003-266819 A | 9/2003 |
| JP | 2009-100321 A | 5/2009 |
| JP | 2009-100322 A | 5/2009 |
| JP | 2009-100323 A | 5/2009 |
| JP | 2012-074923 A | 4/2012 |

\* cited by examiner

FIG. 13

| PRIORITIZED PROCESS | DATA TRANSFER SPEED | CONTROLLER | IMAGE FORMING APPARATUS | needPPM |
|---|---|---|---|---|
| IMAGE FORMATION | maxTPM > needPPM | TRANSMIT THROUGH COMMUNICATION PATH CORRESPONDING TO maxTPM | RECEIVE THROUGH COMMUNICATION PATH CORRESPONDING TO maxTPM | 60 |
| IMAGE FORMATION | maxTPM ≤ needPPM | TRANSMIT THROUGH PLURAL COMMUNICATION PATHS | RECEIVE THROUGH PLURAL COMMUNICATION PATHS | |
| IP SCANNING | maxTPM > needSPM | RECEIVE THROUGH COMMUNICATION PATH CORRESPONDING TO maxTPM | TRANSMIT THROUGH COMMUNICATION PATH CORRESPONDING TO maxTPM | 50 |
| IP SCANNING | maxTPM ≤ needSPM | RECEIVE THROUGH PLURAL COMMUNICATION PATHS | TRANSMIT THROUGH PLURAL COMMUNICATION PATHS | |

IMAGE FORMATION CONTROL METHOD, IMAGE FORMING SYSTEM, AND IMAGE FORMING APPARATUS FOR CONTROLLING DATA TRANSFER AMONG A PLURALITY OF COMMUNICATION PATHS

The entire disclosure of Japanese Patent Application No. 2016-014648 filed on Jan. 28, 2016 including description, claims, drawings, and abstract are incorporated herein by reference in its entirety.

BACKGROUND OF THE INVENTION

Field of the Invention

The present invention relates to a technique for a reliable data transfer in and a stable operation of an image forming system.

Description of the Related Art

Original image data (print data) generated by a computer is described in a page language, and the original image data is transmitted from the computer to a print controller (hereinafter referred to as "controller"). Then, the original image data is subjected to RIP: Raster Image Processing by the controller and converted into image formation image data in a bitmap format. Image formation is performed by an image forming apparatus on the basis of the image formation image data.

Meanwhile, scanning of an original document is performed by an image reading unit provided in the image forming apparatus, and scanned image data obtained by the scanning is stored by the controller. The scanned image data stored by the controller is transmitted to an external computer or server. Such scanning is also called IP scanning, and is performed on the basis of a command from a computer.

As described above, a data transfer of the image formation image data and the scanned image data is performed between the controller and the image forming apparatus. The image formation image data and the scanned image data are each independent data, thus it is desired that data transfers of these pieces of data are performed in parallel. For this reason, some image forming systems include a plurality of communication paths provided between a controller and an image forming apparatus, and the plurality of communication paths are capable of performing plural data transfers in parallel.

With regard to data transfers in an image forming apparatus, various related proposals are disclosed in JP 2002-247270 A, JP 2012-74923 A, JP 2009-100321 A, JP 2009-100322A, and JP 2009-100323 A.

Meanwhile, in a communication path, sometimes data transfer speed decreases due to an increase in communication errors caused by various factors such as a contact failure of connectors, deterioration of a cable, and mixing of an external noise.

In this case, normally the communication path (a communication cable including a connector) should be replaced, but in some cases the communication path cannot be replaced right away. Therefore, it is desired that as less trouble (something that causes a user to wait) as possible is caused.

JP 2002-247270 A, JP 2012-74923 A, JP 2009-100321 A, JP 2009-100322 A, and JP 2009-100323 A disclose that, in the case where an error has occurred in a portion of a component such as the communication path, the error is addressed by restricting some function or operating only a prioritized portion. That is, for some functions, causing a user to wait has been inevitable.

SUMMARY OF THE INVENTION

An object of the present invention is to provide an image formation control method, an image forming system, and an image forming apparatus that can reduce the trouble of user's waiting time in the case where data transfer speed in a communication path is decreased in an image forming system including a plurality of communication paths while keeping as many functions of the image forming system as possible.

That is, the present inventions for solving the above problem are as follows.

(1) To achieve the abovementioned object, according to an aspect, there is provided an image formation control method for controlling an image forming system, the image forming system including a controller that converts original image data into image formation image data, an image forming apparatus that includes a control unit and an image forming unit and forms an image on a sheet on a basis of the image formation image data, a plurality of communication paths through which plural pieces of data are capable of being transferred in parallel between the controller and the image forming apparatus, and a measurement unit that measures data transfer speed of each of the plurality of communication paths, and the image formation control method reflecting one aspect of the present invention comprises causing the control unit to refer to the data transfer speed of each of the plurality of communication paths measured by the measurement unit and to assign a data transfer to each of the plurality of communication paths.

To achieve the abovementioned object, according to an aspect, an image forming system reflecting one aspect of the present invention comprises: a controller that converts original image data into image formation image data; an image forming apparatus that includes a control unit and an image forming unit and forms an image on a sheet on a basis of the image formation image data; a plurality of communication paths through which plural pieces of data are capable of being transferred in parallel between the controller and the image forming apparatus; and a measurement unit that measures data transfer speed of each of the plurality of communication paths, wherein the control unit refers to the data transfer speed of each of the plurality of communication paths measured by the measurement unit and assigns a data transfer to each of the plurality of communication paths.

To achieve the abovementioned object, according to an aspect, an image forming apparatus reflecting one aspect of the present invention is capable of being connected to an image forming system, and the image forming system includes a controller that converts original image data into image formation image data, an image forming apparatus that includes a control unit and an image forming unit and forms an image on a sheet on a basis of the image formation image data, a plurality of communication paths through which plural pieces of data are capable of being transferred in parallel between the controller and the image forming apparatus, and a measurement unit that measures data transfer speed of each of the plurality of communication paths, wherein the control unit refers to the data transfer speed of each of the plurality of communication paths measured by the measurement unit and assigns a data transfer to each of the plurality of communication paths.

(2) According to the image formation control method of Item. 1, in a case where an order of priority is determined for plural data transfers between the controller and the image forming apparatus and the plural data transfers are performed in parallel, the control unit preferably assigns a data transfer with a higher priority to a communication path with a higher data transfer speed.

(3) According to the image formation control method of Item. 1, in a case where an order of priority is determined for a first data transfer from the controller to the image forming apparatus and a second data transfer from the image forming apparatus to the controller and the first data transfer and the second data transfer are performed in parallel, the control unit preferably assigns a data transfer with a higher priority to a communication path with a higher data transfer speed.

(4) According to the image formation control method of Items. 1 to 3, in a case where a communication path with a high data transfer speed does not satisfy a requirement of data transfer speed for a data transfer with a high priority, the control unit preferably assigns two or more of the plurality of communication paths to the data transfer with a high priority.

(5) According to the image formation control method of Items. 1 to 4, in a case where the data transfer speed of a communication path measured by the measurement unit does not reach a predetermined threshold value, the control unit preferably performs control to notify a decrease in the data transfer speed.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 13 is a table referred to in an operation of the embodiment of the present invention;

DESCRIPTION OF THE PREFERRED EMBODIMENTS

Hereinafter, embodiments of an image formation control method, an image forming system, and an image forming apparatus that can reduce the trouble of user's waiting time in the case where data transfer speed in a data communication path is decreased in an image forming system including plural data communication paths while keeping as many functions of the image forming system as possible will be described in detail with reference to the drawings. However, the scope of the invention is not limited to the illustrated examples.

[Configuration of Image Forming Apparatus]

Figure 1:
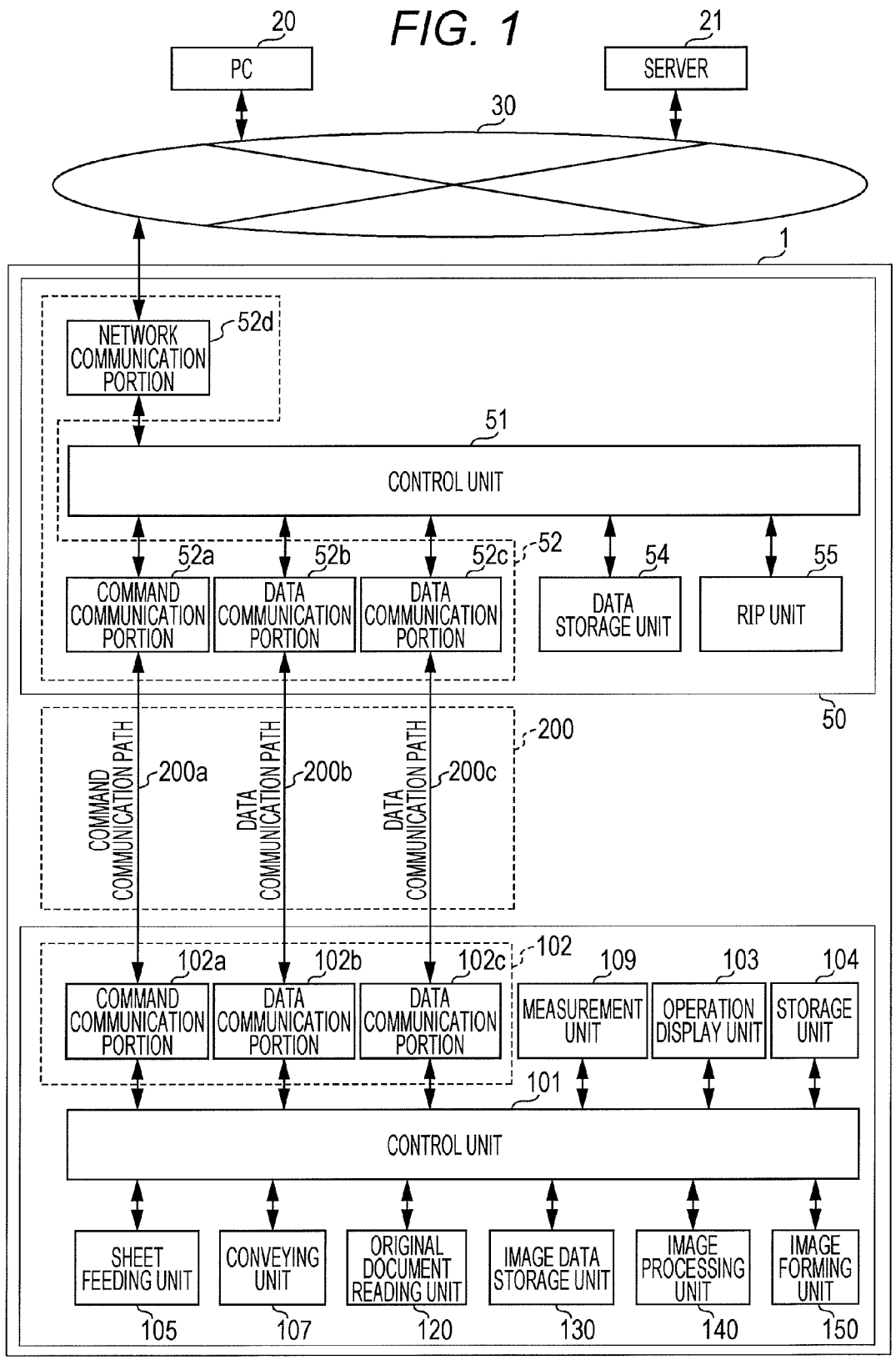
FIG. 1 is a configuration diagram illustrating a configuration of an embodiment of the present invention.
Figure 2:
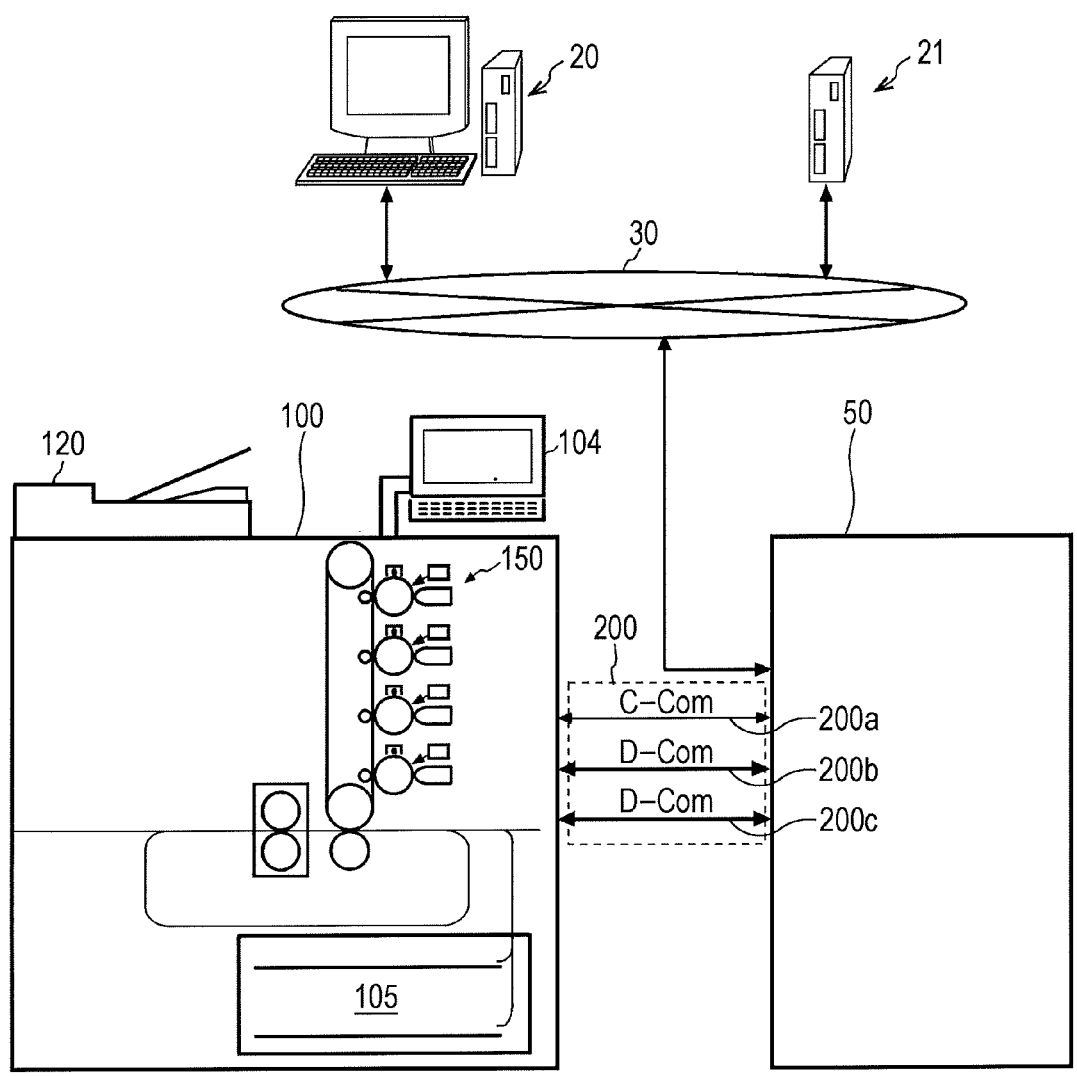
FIG. 2 is a configuration diagram illustrating a configuration of the embodiment of the present invention.

An exemplary configuration of an image forming system 1 including a controller 50 and an image forming apparatus 100 will be described in detail with reference to FIGS. 1 and 2. FIG. 1 is a function block diagram illustrating functions of components, and FIG. 2 is an illustration of mechanical constituents of components of the image forming apparatus 100. In these figures, a network 30 to which the image forming system 1 is connected, a PC: Personal Computer 20 serving as an information processing terminal connected to the network 30, and a server 21 that stores data on the network are also illustrated.

The PC 20 generates original image data (data for printing other than a raster image) described in a PDL: Page Description Language, and transmits the original image data to the image forming system 1 via the network 30. The server 21 stores various data such as scanned image data.

The image forming system 1 includes the controller 50, an image forming apparatus 100, and a plurality of communication paths 200 through which data transfers between the controller 50 and the image forming apparatus 100 are performed.

The controller 50 included in the image forming system 1 includes a control unit 51, a communication unit 52, a data storage unit 54, and an RIP unit 55. The control unit 51 controls each component, the communication unit 52 communicates with another apparatus, the data storage unit 54 stores original image data and image formation image data, and the RIP unit 55 generates the image formation image data by performing RIP on the original image data.

The communication unit 52 includes a command communication portion 52a, a data communication portion 52b, a data communication portion 52c, and a network communication portion 52d. The command communication portion 52a transmits and receives various commands to and from the image forming apparatus 100 via a command communication path (C-Com) 200a. The data communication portion 52b transmits and receives image data to and from the image forming apparatus 100 via a data communication line (D-Com) 200b. The data communication portion 52c transmits and receives image data to and from the image forming apparatus 100 via a data communication line (D-Com) 200c. The network communication portion 52d transmits and receives various data via the network 30.

The image forming apparatus 100 includes a control unit 101, a communication unit 102, an operation display unit 103, a storage unit 104, a sheet feeding unit 105, a conveying unit 107, a measurement unit 109, an original document reading unit 120, an image data storage unit 130, an image processing unit 140, and an image forming unit 150. The control unit 101 controls each component included in the image forming apparatus 100. The communication unit 102 communicates with another apparatus connected thereto. The operation display unit 103 displays the state of the image forming apparatus, and a user inputs operations through the operation display unit 103. The storage unit 104 stores various settings. The sheet feeding unit 105 is capable of feeding a sheet housed in a sheet feeding tray. The conveying unit 107 conveys the sheet in the image forming apparatus 100. The measurement unit 109 monitors the data transfer speed and the error rate (error occurrence rate) of communication paths 200 that will be described later. The original document reading unit 120 reads an original document to generate read image data. The image data storage unit 130 stores image data for image formation and various data. The image processing unit 140 performs various image processing necessary for image formation. The image forming unit 150 forms an image on a sheet on the basis of an image formation command and image formation image data.

The communication unit 102 includes a command communication portion 102a, a data communication portion 102b, and a data communication portion 102c. The command communication portion 102a transmits and receives various commands to and from the controller 50 via the command communication path (C-Com) 200a. The data communication portion 102b transmits and receives image data to and from the controller 50 via the data communication line (D-Com) 200b. The data communication portion 102c transmits and receives image data to and from the controller 50 via the data communication line (D-Com) 200c. The communication unit 102 may also include a network communication portion (not illustrated) that transmits and receives various data via the network 30.

As illustrated in FIG. 2, the image forming unit 150 adopts a so-called electrophotographic system, in which electrostatic latent images formed on electrified image carriers are developed to form toner images, and the toner images of respective colors are superposed on one another on an intermediate transfer member and then transferred onto a sheet. However, the specific configuration of the image forming unit 150 is not limited to the configuration illustrated in FIG. 2.

The communication paths 200 include the command communication path 200a and plural data communication paths 200b and 200c for performing data transfers between the controller 50 and the image forming apparatus 100. Although two data communication paths 200b and 200c are illustrated herein, three or more data communication paths may be present.

In the specification of the present application, the phrasing "a plurality of communication paths" means that plural (two or more) data communication paths (200b and 200c in FIGS. 1 and 2) that are capable of mutual communication in which image data is transmitted and received are provided in addition to the command communication path 200a. The data communication paths may be plural separate communication cables or an apparently single communication cable that includes signal lines that realize plural data communication paths described above.

[Operation]

Figure 3:
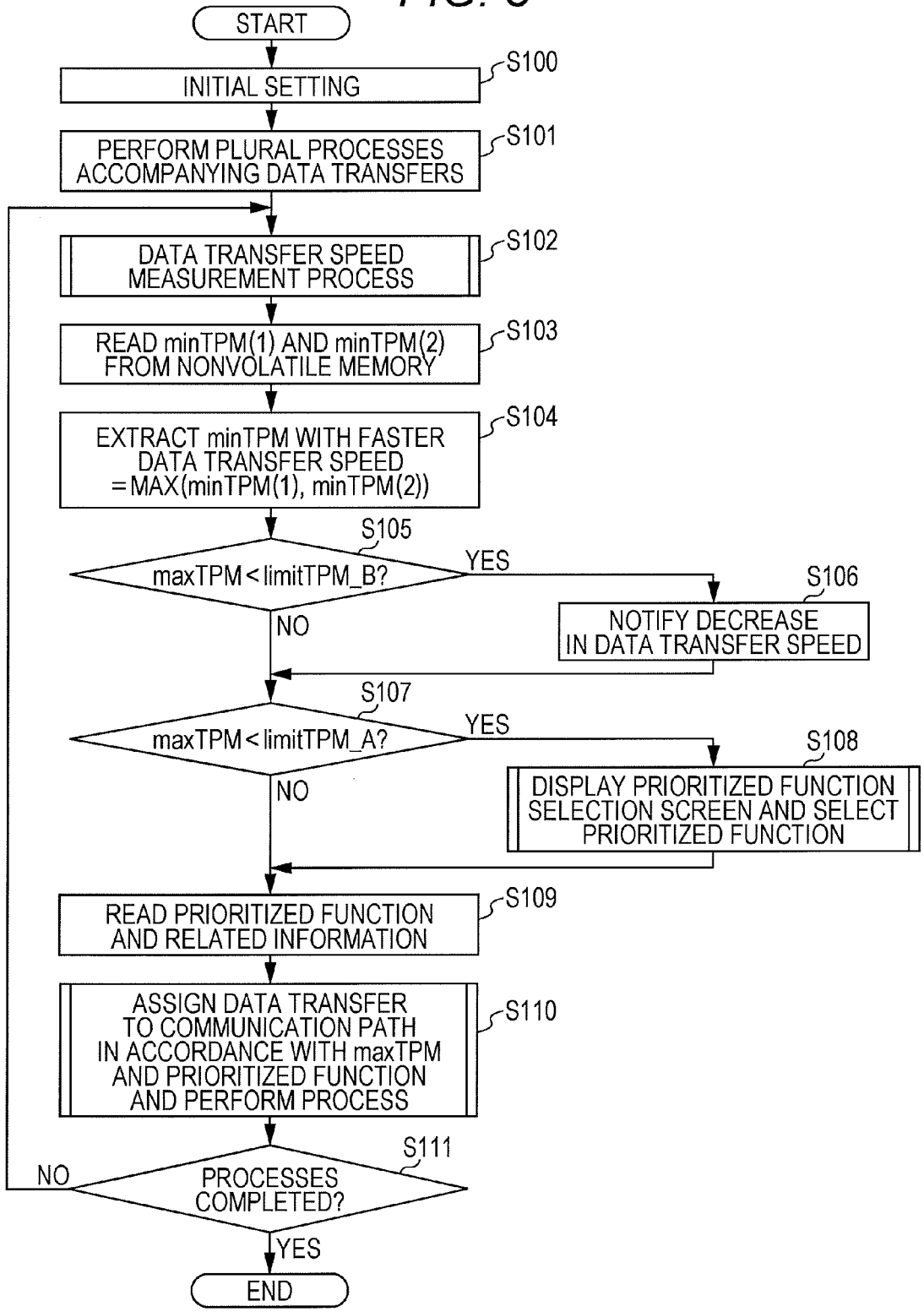
FIG. 3 is a flowchart illustrating an operation of the embodiment of the present invention.
Figure 4:
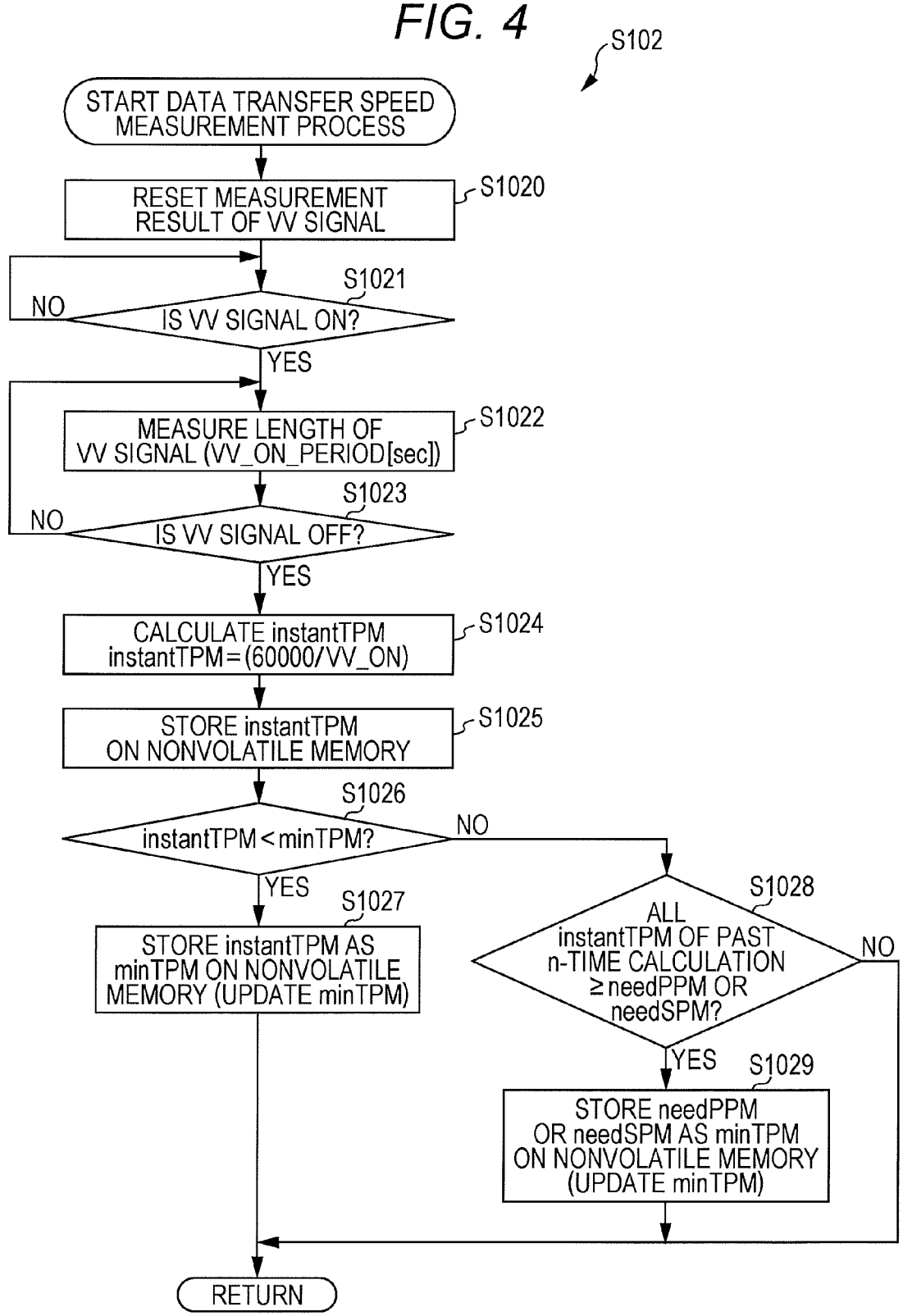
FIG. 4 is a flowchart illustrating an operation of the embodiment of the present invention.
Figure 5:
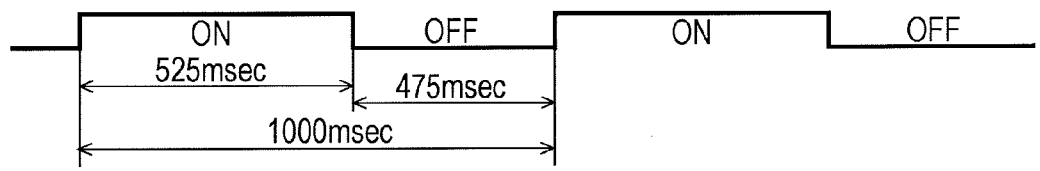
FIG. 5 is a timing chart illustrating an operation state of the embodiment of the present invention.
Figure 6:
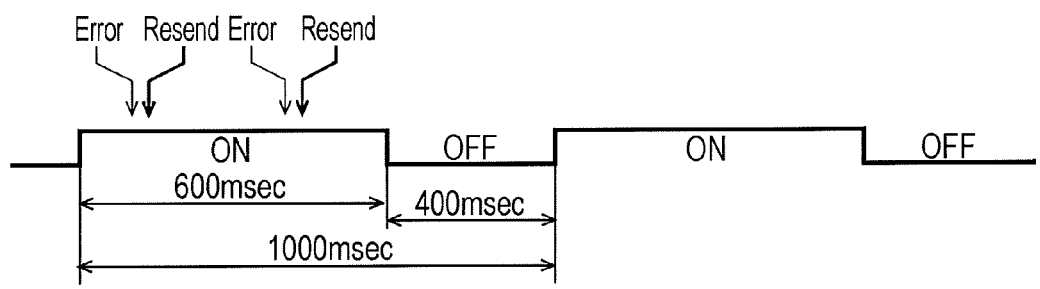
FIG. 6 is a timing chart illustrating an operation state of the embodiment of the present invention.
Figure 7:
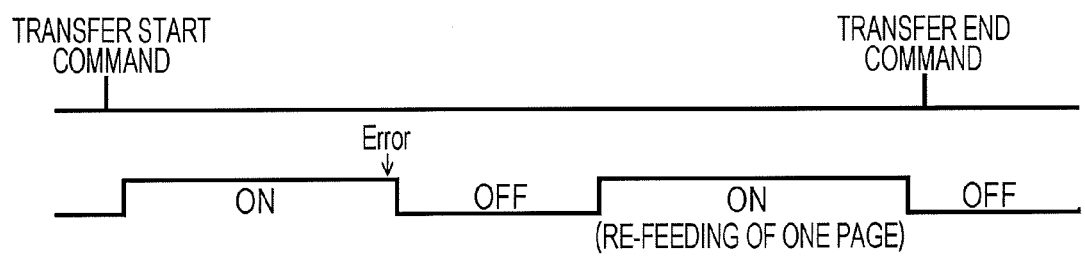
FIG. 7 is a timing chart illustrating an operation state of the embodiment of the present invention.

The operation of the image forming system 1 including the image forming apparatus 100 according to the present embodiment will be described below with reference to drawings. FIG. 3 is a flowchart illustrating an overall behavior of control related to data transfers according to the present embodiment. FIG. 4 is a flowchart of a subroutine related to transfer speed measurement for the data transfers according to the present embodiment. FIGS. 5 to 7 are timing charts related to the data transfer speed measurement. FIGS. 8 to 11 are illustrations of exemplary display screens. FIG. 12 is a flowchart of a subroutine related to processing for selected functions in the data transfers according to the present embodiment. FIG. 13 is a table referred to in processing. FIGS. 14 to 17 are illustrations of behaviors of assigning a data transfer to each of the plurality of data communication paths.

In the case where the power of the image forming apparatus 100 is turned on, the control unit 101 reads various setting data stored in the storage unit 104 that is nonvolatile, and initializes each component in the image forming apparatus 100 by using the various setting data (step S100 in FIG. 3).

The various setting data includes a predetermined order of priority between plural data transfers (or various operations accompanying plural data transfers) between the controller 50 and the image forming apparatus 100. Here, "predetermined" corresponds to settings set at the time of shipping from a factory, at the start of use by a user, or during the last use by a user.

The order of priority may be a setting in which with a priority/without a priority (not prioritized) are set, or may be a setting in which priorities are determined in plural levels.

In the various setting data, a data transfer threshold value limitTPM_A and a data transfer threshold value limitTPM_B are set as threshold values for notifying a warning or a caution in the case where the data transfer speed decreases. Here, "predetermined" corresponds to settings set at the time of shipping from a factory or at the start of use by a user.

In addition, as will be described below, the controller 50 and the image forming apparatus 100 perform plural processes accompanying data transfers to each other such as image formation and image reading (step S101 in FIG. 3)

In the PC 20, original image data (print data other than a raster image) described in, for example, the PDL is generated by a user. The original image data of a PDL format is provided to the controller 50 of the image forming system 1 via the network 30, accompanied by a command of image formation. After receiving such original image data, the controller 50 causes the RIP unit 55 to perform RIP to generate image formation image data of a bitmap format from the original image data in accordance with a command from the control unit 51. The control unit 51 temporarily stores the generated image formation image data on the data storage unit 54. The control unit 51 reads the image formation image data from the data storage unit 54 and transmits the image formation image data to the image forming apparatus 100 via the data communication portion 52b and the data communication path 200b. On the basis of control by the control unit 101, the image forming apparatus 100 receives the image formation image data from the data communication path 200b via the data communication portion 102b, and stores the received image formation image data on the image data storage unit 130.

Meanwhile, in the image forming apparatus 100, the original document reading unit 120 scans an original image on the basis of a command received from the PC 20 via the network 30, and read image data of the original document read by the original document reading unit 120 is generated. On the basis of a command from the control unit 101, the read image data is temporarily stored on the image data storage unit 130, and is then transmitted to the controller 50 via the data communication portion 102c and the data communication path 200c. In the controller 50, on the basis of control by the control unit 51, the read image data received from the image forming apparatus 100 is temporarily stored on the data storage unit 54, and is then transmitted to the PC 20 or the server 21 via the network communication portion 52*d* and the network 30.

Although the image formation image data is transferred through the data communication path 200*b* and the read image data is transferred through the data communication path 200*c* in the description above, the data transfer is not limited to this example. Examples of the plural processes accompanying data transfers include a process of reading an output product (a normal image formation output product or a chart) to obtain read image data of the output product by the image forming apparatus 100 and transmitting the read image data of the output product to the controller 50.

In a period in which the plural processes accompanying data transfers described above are performed, the measurement unit 109 in the image forming apparatus 100 performs a process of measuring the data transfer speed of the data communication path 200*b* and the data communication path 200*c* (step S102 in FIG. 3).

For the description of this process of measuring the data transfer speed (step S102 in FIG. 3), the flowchart of FIG. 4 and the timing charts of FIGS. 5 to 7 will be referred to. In the case where the plural processes accompanying the plural data transfers are not performed, the control unit 101 and the control unit 51 generates dummy data of the same size and the same timing as the image formation image data and the read image data in response to a request from the measurement unit 109, and the data transfer speed is thereby measured.

The measurement unit 109 resets a result (VV_ON_period [sec]) of past measurement of a VV: Vertical Valid signal stored on the nonvolatile storage unit 104 (step S1020 in FIG. 4). Then, the measurement unit 109 monitors whether the VV signal is ON (active) (step S1021 in FIG. 4). The VV signal is a signal that takes an ON (active) state while the image formation image data is actually being transferred, and will be described with reference to FIGS. 5 to 7

In the present embodiment, a case where the image formation speed is 60 PPM: Paper Per Minute, in which the image forming unit 150 is capable of outputting 60 sheets of paper per minute, is assumed. In the case where a finisher is connected to the image forming apparatus 100 for a latter stage of the image formation process, the number of sheets that can be output may be determined in consideration of the processing performance of the finisher. In the present embodiment, a case where the image reading speed is 60 SPM: Sheet Per Minute, in which the original document reading unit 120 is capable of reading 60 sheets of original documents per minute, is assumed.

In addition, a case where the controller 50 generates image formation image data at a line speed of 400 mm/sec in the sub-scanning direction corresponding to the speed of 60 PPM is assumed.

In this case, the image formation image data is transmitted from the controller 50 to the image forming apparatus 100 at every second (1000 msec).

In the case where the image formation speed is X PPM, the image formation image data is transmitted at every 60/X second. In the case where the image reading speed is Y SPM, the read image data is transmitted at every 60/Y second. In the present embodiment, the case where X and Y are both 60, and the image formation image data and the read image data are transferred at every second will be described.

In addition, as illustrated in the timing chart of FIG. 5, in the case where a paper sheet of an A4 size (sub-scanning direction length: 210 mm) is used, the length of the period in which the VV signal is ON is (210 mm/400 mm)×1 sec=0.525 sec, and the length of an OFF period is 1000 msec−525 msec=475 msec, when 1 second (1000 msec) is set as a standard. To be noted, the length of the ON period of the VV signal is a value in an ideal state in which no re-feeding due to an error or the like has occurred. Therefore, in the case where re-feeding occurs due to an error or the like, the ON period becomes longer in correspondence with the re-feeding.

That is, the measurement unit 109 monitors the ON period of the VV signal (step S1021 in FIG. 4), and measures a length VV_ON_period of the ON period of the VV signal (steps S1022 and S1023 in FIG. 4). For example, the VV_ON_period is 525 msec in the ideal state illustrated in FIG. 5, but is 600 msec in a state where re-feeding has occurred due to an error or the like illustrated in FIG. 6. Accordingly, the measurement unit 109 is capable of grasping the actual data transfer speed by measuring the VV_ON_period. In addition, it is also possible to grasp the data transfer speed by using a data-transfer start command and a data-transfer end command in place of the VV signal to set the data-transfer start command as the rising of the VV and the data-transfer end command as the falling of the VV as illustrated in FIG. 7 and measuring the time required for the data transfer in a similar manner. In the embodiment that will be described below, the case where the VV_ON_period is measured will be described as a specific example.

In this embodiment, the measurement unit 109 measures a VV_ON_period like the VV_ON_period described above, and calculates data transfer speed per minute TPM: Transfer Per Minute from the reciprocal of the VV_ON_period.

Here, the measurement unit 109 calculates an instantaneous TPM of one minute as an instantTPM=60000/(VV_ON_period) for each of the data communication path 200*b* and the data communication path 200*c* (step S1024 in FIG. 4).

Then, the measurement unit 109 stores the instantTPM calculated in this way on the nonvolatile storage unit 104 (step S1025 in FIG. 4). As the instantTPM, the latest instantTPMs of a predetermined number of n are stored for each of the data communication path 200*b* and the data communication path 200*c* on the storage unit 104 in a format similar to a ring buffer.

To be noted, a VV_OFF_period is not taken into consideration and only the VV_ON_period is considered as a transfer period of image data, and thus the instantTPM represents how many pieces of image data can be transferred in a unit time of 60 seconds. Therefore, with the value of 525 msec of the ideal state described above, the instantTPM is 60000 msec/525 msec=114 TPM. Alternatively, the calculation of the instantTPM may be performed after adding a margin of a msec to the VV_ON_period in advance.

If re-feeding due to an error has occurred and an A4 transfer time is 600 msec as illustrated in FIG. 6, the instantTPM will be 60000/600=100 TPM. In this case, the data transfer speed is decreased by about 12.5% to become 87.5% of the ideal value of 114 TPM.

In addition, in the case where re-feeding due to an error has occurred and the A4 transfer time is 1000 msec, the instantTPM is 60000/1000=60 TPM. In this case, the data transfer speed is decreased by about 47.3% to become 52.6% of the ideal value of 114 TPM.

If the transfer time for the image formation image data of an A4 size from the controller 50 to the image forming apparatus 100 exceeds 1 second (1000 msec), it will not be possible to keep 60 PPM described above, and the operation of image formation output at a constant speed will end up in a failure. In the same way, if the transfer time for the read image data of an A4 size from the image forming apparatus 100 to the controller 50 exceeds 1 second (1000 msec), it will not be possible to keep 60 SPM described above, and the operation of image reading at a constant speed will end up in a failure. Accordingly, 60 PPM of 60-sheet output/minute and 60 SPM of 60-sheet reading/minute will be respectively referred to as needPPM and needSPM, which respectively mean a necessary PPM value and a necessary SPM value.

The measurement unit 109 calculates the instantTPM for each transfer of image data (for each measurement of VV_OFF_period). In the case where the measurement unit 109 compares the latest calculated value of instantTPM with the minimum value (minTPM) among past instantTPMs (step S1026 in FIG. 4) and the latest calculated value of instantTPM is smaller than the minimum value (YES in step S1026 in FIG. 4), the latest calculated value of instantTPM is stored as a new minimum value minTPM on the nonvolatile storage unit 104 (step S1027 in FIG. 4).

Values of needPPM and needSPM are stored as the initial value of a reset value of the minTPM in step S1029 that will be described later.

The value of needPPM is, as has been already described, a threshold value for the failure of the operation of image formation output at a constant speed. In addition, the value of needSPM is, as has been already described, a threshold value for the failure of the operation of original document reading at a constant speed.

In the case where the image data is image formation image data and it is confirmed that all the instantTPMs of n times of past calculation stored on the storage unit 104 surpass the needSPM (YES in step S1028 in FIG. 4), the measurement unit 109 stores the needPPM as the minTPM (updates the minTPM) on the storage unit 104 (step S1029 in FIG. 4). In addition, in the case where the image data is read image data and it is confirmed that all the instantTPMs of n times of past calculation stored on the storage unit 104 surpass the needSPM (YES in step S1028 in FIG. 4), the measurement unit 109 stores the needSPM as the minTPM (updates the minTPM) on the storage unit 104 (step S1029 in FIG. 4). This reset may be performed after confirming a normal state as described above (YES in step S1028 in FIG. 4) as described above, and may be performed in accordance with a command from a user or a service staff.

After the data transfer speed measurement process described above (step S102 in FIG. 3: steps S1020 to S1029 in FIG. 4), the measurement unit 109 reads the minTPM of each of the data communication path 200b and the data communication path 200c from the storage unit 104 (step S103 in FIG. 3). Here, the minTPM of the data communication path 200b will be referred to as minTPM(1) and the minTPM of the data communication path 200c will be referred to as minTPM(2).

Then, the measurement unit 109 compares the minTPM(1) with the minTPM(2), and extracts the relatively higher of the two as maxTPM (step S104 in FIG. 3).

The measurement unit 109 compares the maxTPM extracted as described above with the data transfer threshold value limitTPM_A and the data transfer threshold value limitTPM_B (steps S105 and S107 in FIG. 3).

It is desirable that "ideal TPM>limitTPM_B>limitTPM_A>needPPM" and "ideal TPM>limitTPM_B>limitTPM_A>needSPM" are set in the initial settings and the initial settings are stored on the storage unit 104.

Figure 8:
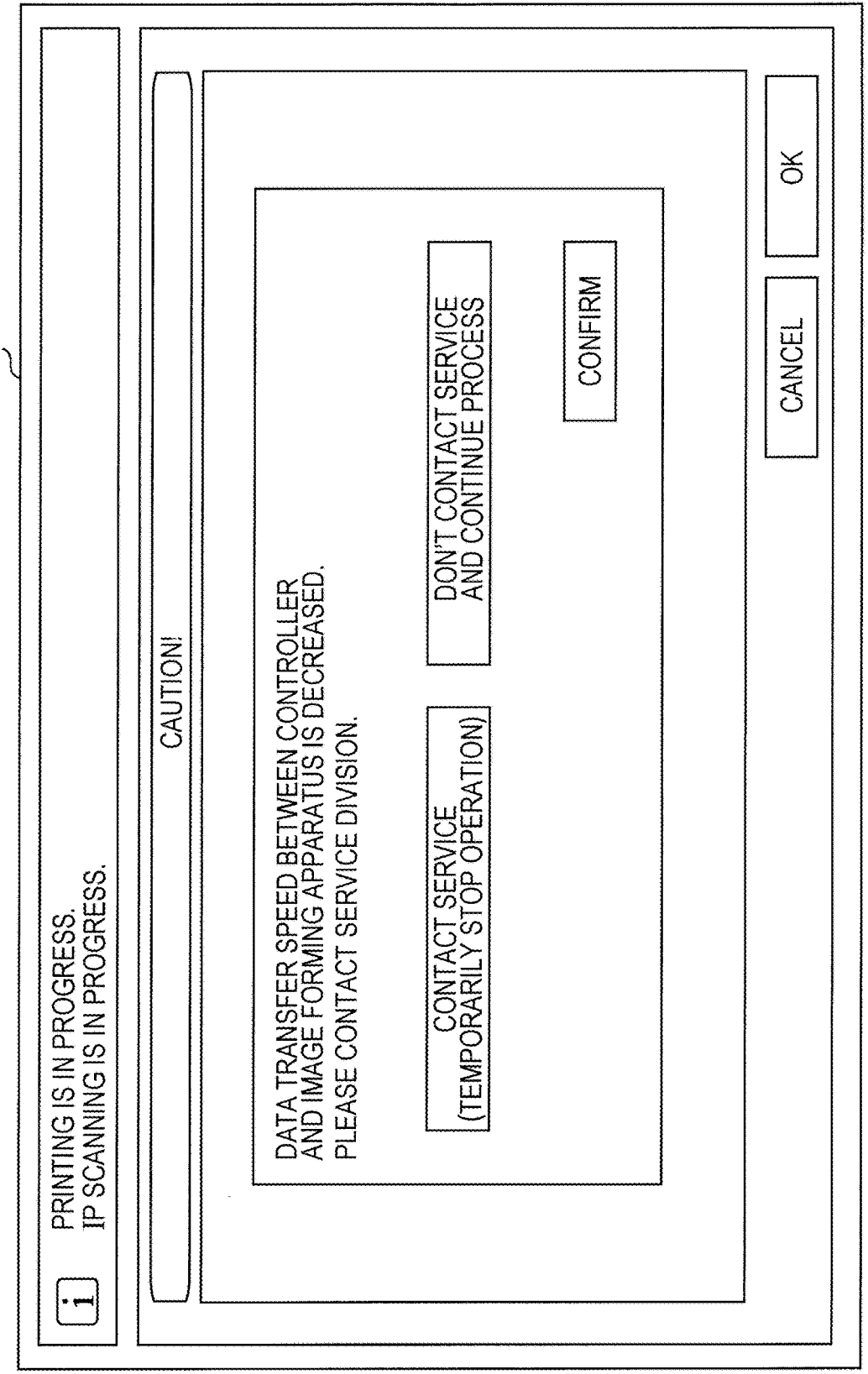
FIG. 8 is an illustration of a display screen in processing of the embodiment of the present invention.

In the case where the data transfer speed decreases to the data transfer threshold value limitTPM_B (YES in step S105 in FIG. 3), the control unit 101 receives a notification from the measurement unit 109, and notifies the user of the decrease in the data transfer speed by displaying a display screen 103G1 on the operation display unit 103 (step S106 in FIG. 3) as illustrated in FIG. 8. In this case, the user is capable of calling a service staff as necessary.

Figure 9:
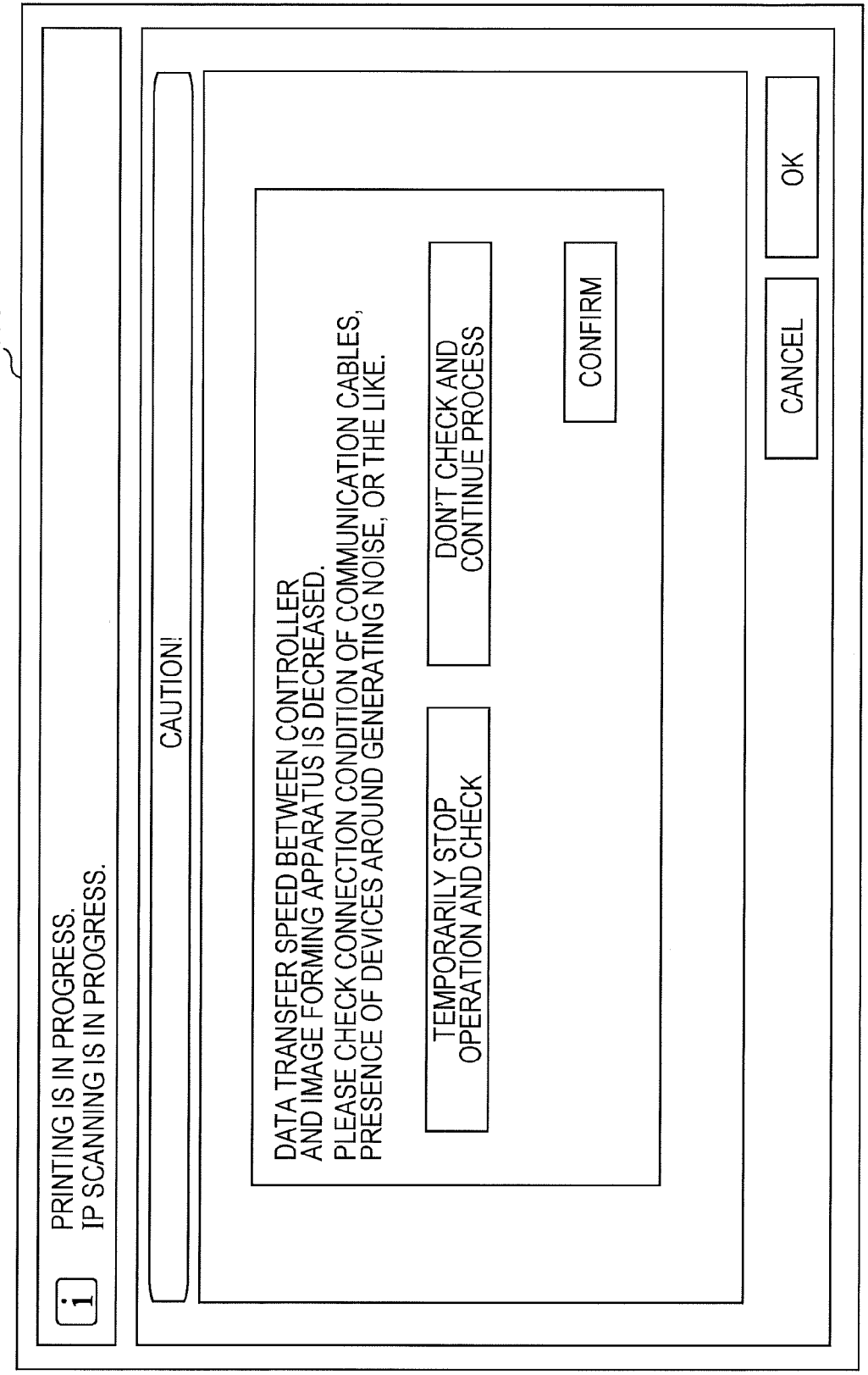
FIG. 9 is an illustration of a display screen in processing of the embodiment of the present invention.

Similarly, in the case where the data transfer speed decreases to the data transfer threshold value limitTPM_B (YES in step S105 in FIG. 3), the control unit 101 receives a notification from the measurement unit 109, and notifies the user of the decrease in the data transfer speed and of an environmental noise check by displaying a display screen 103G2 on the operation display unit 103 (step S106 in FIG. 3) as illustrated in FIG. 9. In this case, the user is capable of checking an environmental noise resource of the controller 50 and the image forming apparatus 100 and the connection condition of a communication cable.

Figure 10:
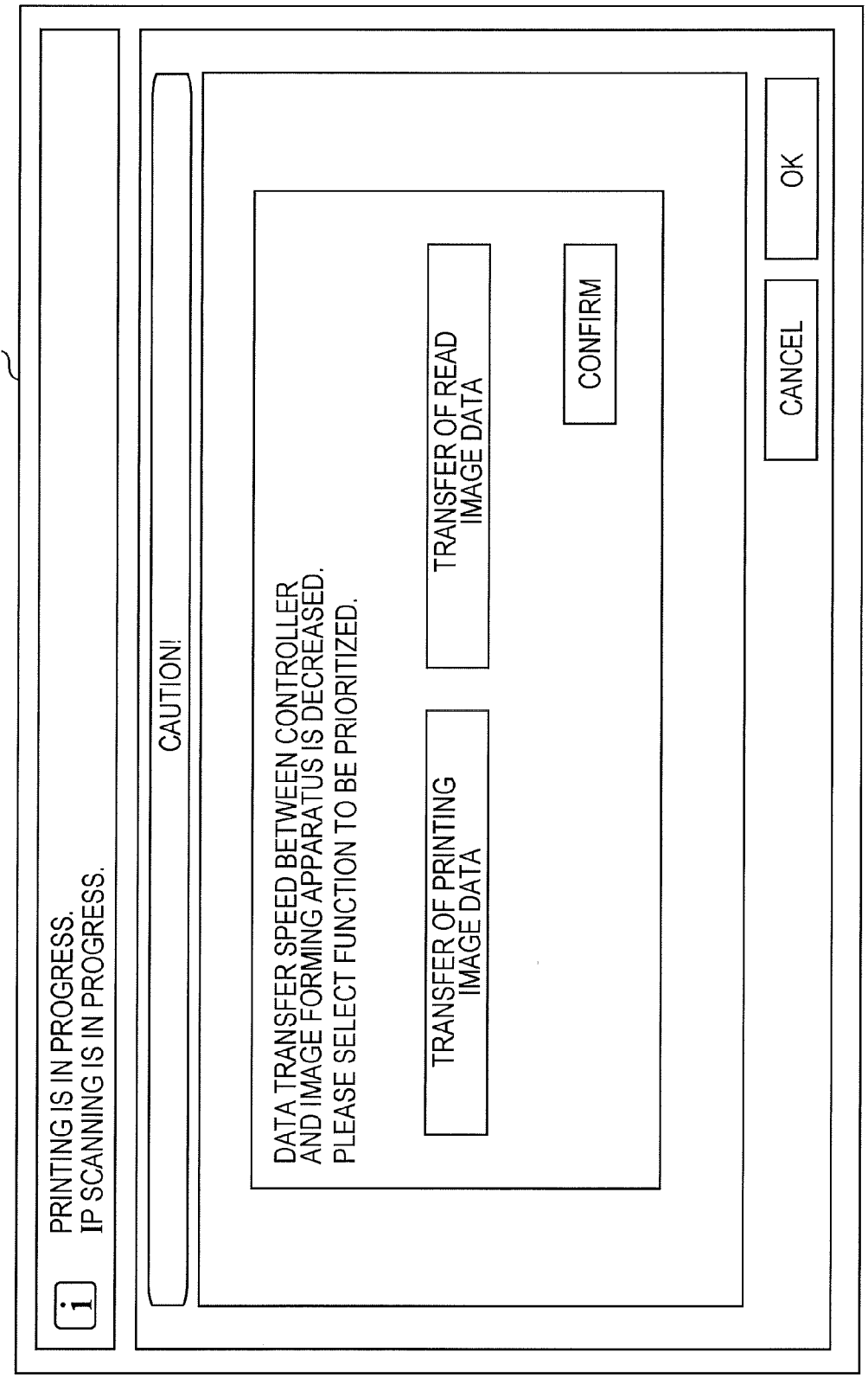
FIG. 10 is an illustration of a display screen in processing of the embodiment of the present invention.

In addition, in the case where the data transfer speed decreases to the data transfer threshold value limitTPM_A (YES in step S107 in FIG. 3), the control unit 101 receives a notification from the measurement unit 109, and causes the user to select a function of a data transfer to be prioritized from the plural data transfers by displaying a display screen 103G3 on the operation display unit 103 (step S108 in FIG. 3) as illustrated in FIG. 10. In the case illustrated in FIG. 10, the user is capable of selecting which of printing image data transfer and read image data transfer is to be prioritized on the display screen 103G3. The function of data transfer selected to be prioritized as described above is stored on the storage unit 104.

Figure 11:
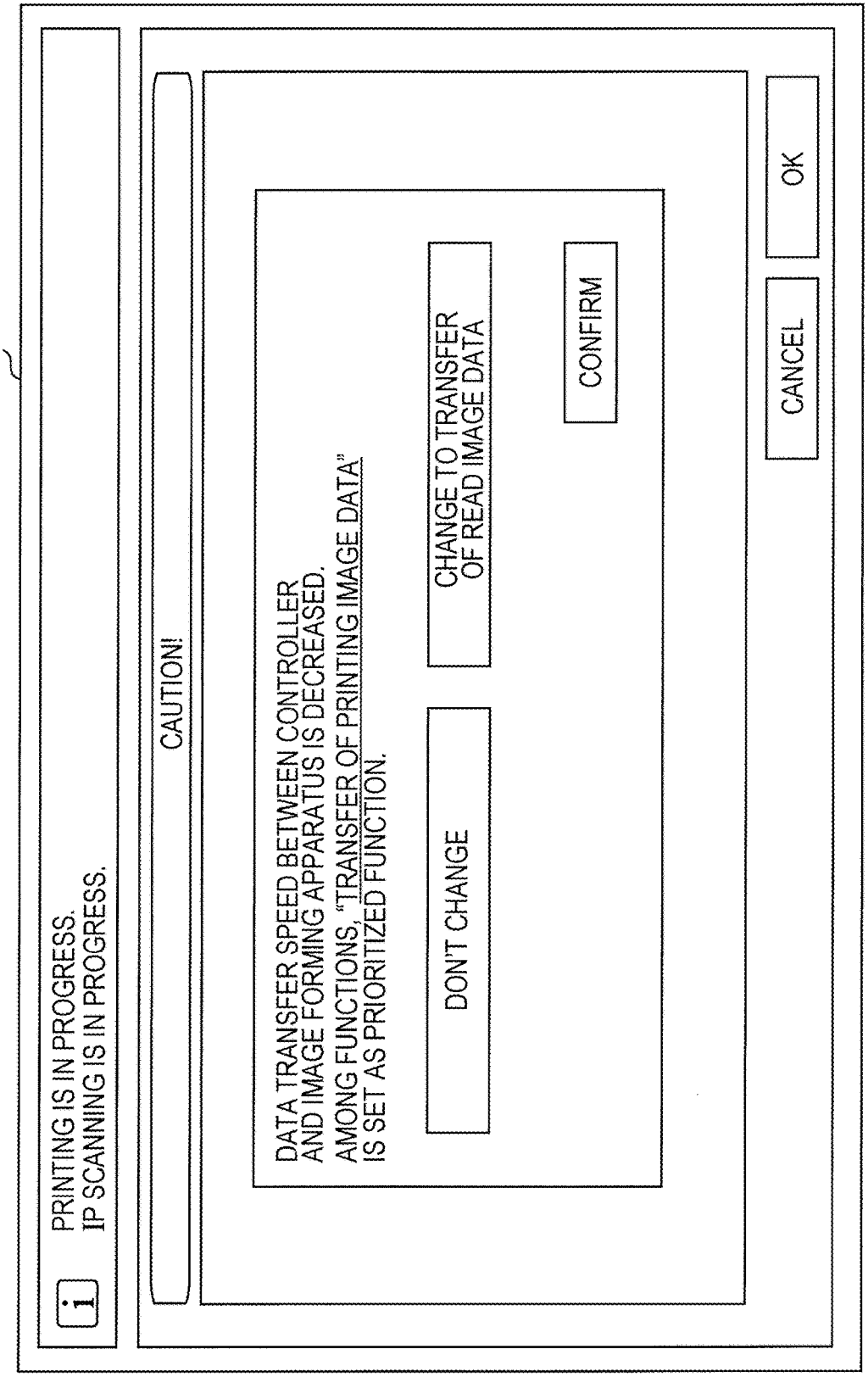
FIG. 11 is an illustration of a display screen in processing of the embodiment of the present invention.
Figure 12:
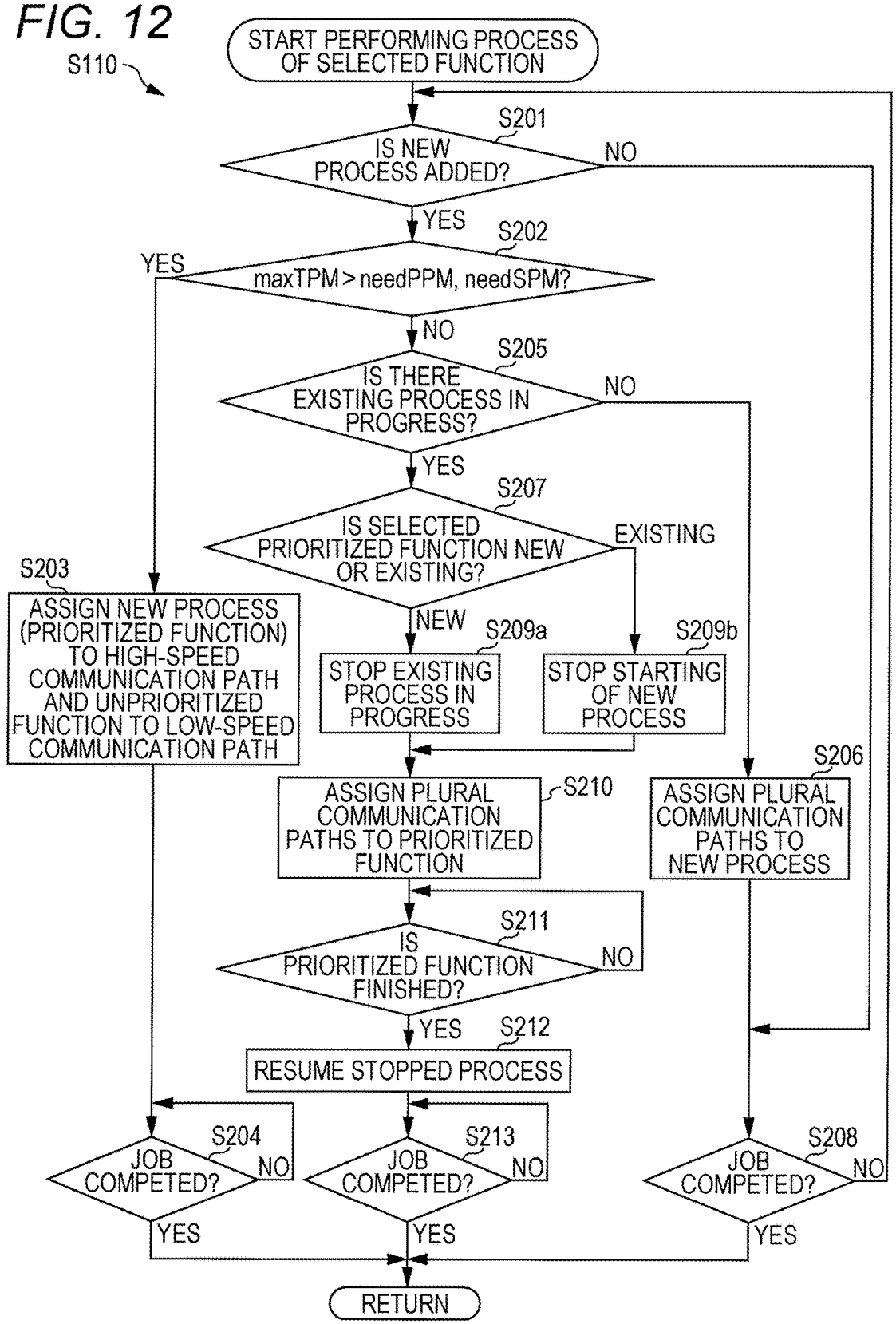
FIG. 12 is a flowchart illustrating an operation of the embodiment of the present invention.

In addition, in the case where the data transfer speed decreases to the data transfer threshold value limitTPM_A (YES in step S107 in FIG. 3), the control unit 101 receives a notification from the measurement unit 109, and causes the user to recognize a priority setting already selected and to select a function of a data transfer to be prioritized from the plural data transfers by displaying a display screen 103G4 on the operation display unit 103 (step S108 in FIG. 3) as illustrated in FIG. 11. In the case illustrated in FIG. 11, the fact that the printing image data transfer is already set to be prioritized is notified on the display screen 103G4, and the user is capable of selecting one of "Don't change" and "Change to transfer of read image data" to be prioritized. The function of data transfer selected to be prioritized as described above is stored on the storage unit 104.

Then, the control unit 101 reads the function of data transfer to be prioritized and information related thereto from the storage unit 104 (step S109 in FIG. 3), assigns a data transfer to each of the plurality of data communication paths in accordance with the data transfer speed (maxTPM) and the prioritized function, and performs control to execute plural processes in parallel (step S110 in FIG. 3). In the case where the plural processes accompanying data transfers are not actually started and the assignment of data transfers is determined by measuring the data transfer speed by using the dummy data or the like, the control unit 101 waits in the state until the plural processes are actually started.

Then, the control unit 101 controls each component to repeatedly perform the steps from the data transfer speed measurement process (step S102 in FIG. 3) to the data transfer assignment (step S110 in FIG. 3) until the process of image formation, image reading, or the like is completed (step S111 in FIG. 3, end).

The data transfer assignment (step S110 in FIG. 3) will be described in detail with reference to the flowchart of FIG.

12, the table of FIG. 13, and the illustrations of behaviors of data transfer assignment of FIGS. 14 to 17.

The control unit 101 checks whether a new process accompanying a data transfer has been added (step S201 in FIG. 12).

In the case where no new process accompanying a data transfer has been added (NO in step S201 in FIG. 12), the control unit 101 repeats the monitoring of addition of a new process (step S201 in FIG. 12) until an existing job is completed. In this case, the control unit 101 does not particularly perform control related to the assignment of data communication paths.

Meanwhile, in the case where a new process accompanying a data transfer has been added (YES in step S201 in FIG. 12), the control unit 101 compares, for the added new process, the maxTPM with the needPPM in the case of image formation and the maxTPM with the needSPM in the case of image reading (step S202 in FIG. 12).

In the case where the maxTPM is higher than the needPPM or the needSPM as a result of the comparison (YES in step S202 in FIG. 12), the control unit 101 controls the assignment of data communication paths such that a prioritized function is assigned to a high-speed data communication path corresponding to the maxTPM used for the comparison and an unprioritized function is assigned to a low-speed data communication path (step S203 in FIG. 12). Then, the control unit 101 controls each component to perform plural jobs accompanying data transfers between the controller 50 and the image forming apparatus 100 in accordance with the assignment (step S204 in FIG. 12).

The control unit 101 may refer to an assignment table (see FIG. 13) stored on the storage unit 104 when determining the assignment of data communication paths. This assignment table includes the prioritized function and assignment of data communication paths therefor according to satisfaction or insatisfaction of conditions (maxTPM>needPPM or maxTPM>needSPM) as illustrated in FIG. 13.

For example, in the case where the prioritized function is image formation and the condition of maxTPM>need PPM is satisfied, the control unit 101 refers to the table of FIG. 13 and assigns the prioritized function (transfer of image formation image data) to a high-speed data communication path corresponding to the maxTPM and another function to a low-speed data communication path.

Figure 14:
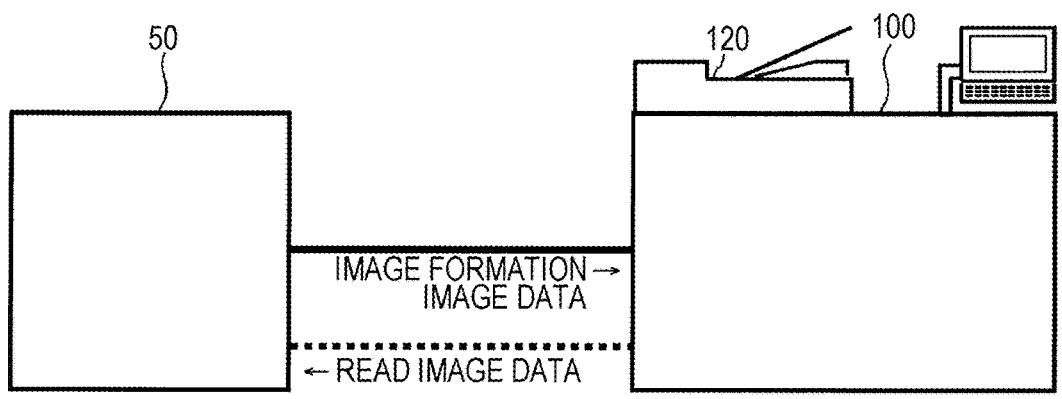
FIG. 14 is an illustration of a behavior in processing of the embodiment of the present invention.

In addition, in the case where the prioritized function is image formation, an unprioritized function is IP scanning, and the condition of maxTPM>needPPM is satisfied, the control unit 101 assigns the transfer of image formation image data, which is the prioritized function, to the high-speed data communication path (solid line) corresponding to the max TPM, and assigns the transfer of read image data, which is the unprioritized function, to the low-speed data communication path (broken line) as illustrated in FIG. 14.

Figure 15:
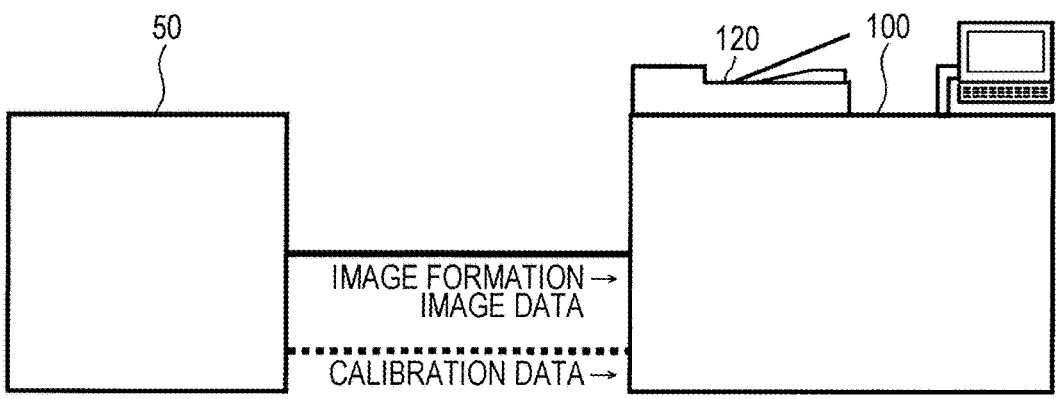
FIG. 15 is an illustration of a behavior in processing of the embodiment of the present invention.

Further, in the case where the prioritized function is image formation, the unprioritized function is transmission of calibration data from the controller 50 to the image forming apparatus 100, and the condition of maxTPM>needPPM is satisfied, the control unit 101 assigns the transfer of image formation image data, which is the prioritized function, to the high-speed data communication path (solid line) corresponding to the max TPM, and assigns the transfer of calibration data, which is the unprioritized function, to the low-speed data communication path (broken line) as illustrated in FIG. 15. In the case illustrated in FIG. 15, the data transfer directions of processes performed in parallel match.

Figure 16:
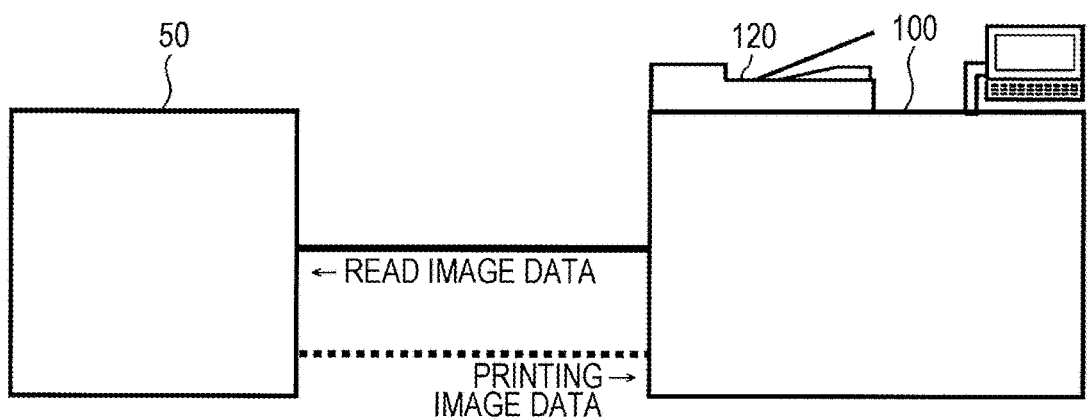
FIG. 16 is an illustration of a behavior in processing of the embodiment of the present invention.

Meanwhile, in the case where the prioritized function is IP scanning, the unprioritized function is image formation, and the condition of maxTPM>needSPM is satisfied, the control unit 101 assigns the transfer of read image data, which is the prioritized function, to the high-speed data communication path (solid line) corresponding to the maxTPM, and assigns the transfer of image formation image data, which is the unprioritized function, to the low-speed data communication path (broken line) as illustrated in FIG. 16.

In the case where the maxTPM is not higher than the needPPM or the needSPM as a result of the comparison for the added new process (NO in step S202 in FIG. 12), the control unit 101 checks whether an existing process in progress is present (step S205 in FIG. 12).

Figure 17:
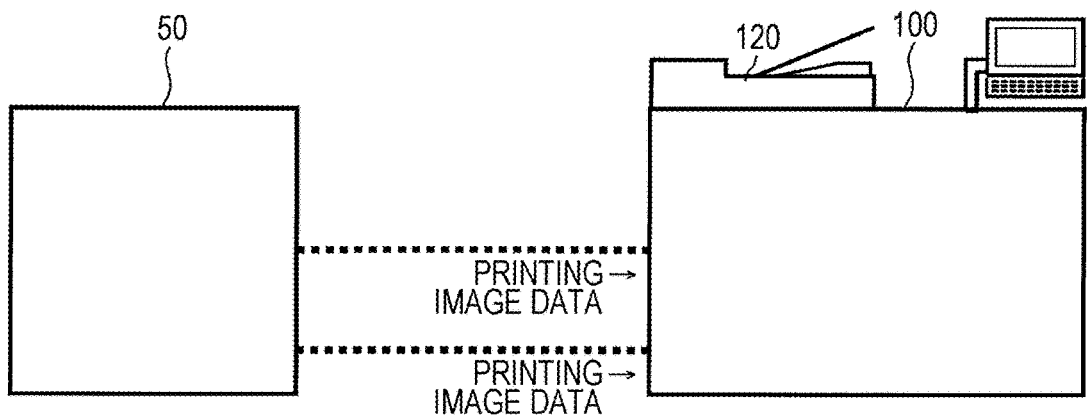
FIG. 17 is an illustration of a behavior in processing of the embodiment of the present invention.

In the case where no existing process in progress is present (NO in step S205 in FIG. 12), the control unit 101 refers to the table of FIG. 13, and controls the assignment of data communication paths such that plural data communication paths are assigned to the added new process (step S206 in FIG. 12). Then, the control unit 101 controls each component to perform a job accompanying a data transfer between the controller 50 and the image forming apparatus 100 in accordance with the assignment (step S208 in FIG. 12). Here, in the case where no existing process in progress is present, it is assumed that the added new process is image formation, and the condition of maxTPM>needPPM is not satisfied, the control unit 101 assigns the transfer of image formation image data, which is the prioritized function, to plural data communication paths (broken lines) as illustrated in FIG. 17.

In the case where an existing process in progress is present (YES in step S205 in FIG. 12), the control unit 101 checks whether the prioritized function is an added new process or an existing process (step S207 in FIG. 12), stops the operation of a process for which no prioritized function is set (step S209a or S209b in FIG. 12), refers to the table of FIG. 13, and controls the assignment of data communication paths such that plural data communication paths are assigned to the process for which the prioritized function is set (step S210 in FIG. 12). The control unit 101 controls each component to perform a job accompanying a data transfer between the controller 50 and the image forming apparatus 100 in accordance with the assignment as described above (step S211 in FIG. 12). Here, in the case where it is assumed that the prioritized function is image formation, and the condition of maxTPM>needPPM is not satisfied, the control unit 101 assigns the transfer of image formation image data, which is the prioritized function, to plural data communication paths (broken lines) as illustrated in FIG. 17.

In the case where the prioritized function is completed (YES in step S211 in FIG. 12), the control unit 101 controls the assignment of data communication paths such that the unprioritized function that has been stopped is started (step S212 in FIG. 12). The control unit 101 controls each component to perform a job accompanying a data transfer between the controller 50 and the image forming apparatus 100 in accordance with the assignment as described above (step S213 in FIG. 12).

[Other Embodiment (1)]

In the description of the embodiment described above, a specific example of data transfer in which two data communication paths 200b and 200c are used has been described. However, the number of data communication paths is not limited to two, and three or more data communication paths may be present.

In the case where three or more data communication paths are present as described above and the same function of data transfer is assigned to plural data communication paths, the sum of minTPMs of the plural data communication paths may be compared with the needPPM or the needSPM to assign data communication paths of a required number.

For Example, in the case where three data communication paths are present, the process of prioritized function may be assigned to all of the three data communication paths, and it is also possible to assign the process of prioritized function to two of the data communication paths and the process of unprioritized function to the remaining one of the data communication paths. That is, the assignment of the prioritized function to plural data communication paths and parallel operation of processes may be performed at the same time.

[Other Embodiment (2)]

According to the configuration illustrated in FIG. 1, the measurement unit 109 that measures the data transfer speed of the data communication paths 200b and 200c is included in the image forming apparatus 100. However, the configuration is not limited to this. That is, the measurement unit 109 may be included in the controller 50, or provided outside the controller 50 and the image forming apparatus 100. In this case, the measurement unit 109 may transmit a notification of the measurement result of the data transfer speed to the control unit 101 via the command communication path 200a or the like.

In addition, a configuration in which the measurement unit 109 is not provided separately and is present as an internal function of the data communication portions 102b and 102c and the data transfer speed is measured in parallel with the execution of communication may be employed.

[Advantageous Effect of Embodiments]

(1) According to the embodiments described above, when controlling the image forming system 1 including the controller 50, the image forming apparatus 100, the plurality of data communication paths 200b and 200c, and the measurement unit 109, the control unit 101 refers to the data transfer speed of each of the data communication paths 200b and 200c measured by the measurement unit 109 and assigns a data transfer to each of the plurality of data communication paths 200b and 200c. As described above, the control unit 101 assigns a data transfer for each of the plurality of data communication paths 200b and 200c, and thus the trouble of user's waiting time can be reduced while keeping as many functions of the image forming system 1 using the plurality of data communication paths 200b and 200c as possible even in the case where the data transfer speed between the controller 50 and the image forming apparatus 100 of the data communication paths 200b and 200c is decreased.

(2) In (1) described above, in the case where an order of priority is determined for plural data transfers between the controller 50 and the image forming apparatus 100 and the plural data transfers are performed in parallel, the controller assigns a data transfer with a higher priority to a data communication path 200 (200b or 200c) with a higher data transfer speed. Thus, the trouble of user's waiting time can be reduced while keeping as many functions of the image forming system 1 accompanied by the plural data transfers as possible even in the case where the data transfer speed between the controller 50 and the image forming apparatus 100 of the data communication paths 200b and 200c is decreased.

(3) In (1) described above, in the case where an order of priority is determined for a first data transfer from the controller 50 to the image forming apparatus 100 and a second data transfer from the image forming apparatus 100 to the controller 50, and the first data transfer and the second data transfer are performed in parallel, the controller assigns a data transfer with a higher priority to a data communication path 200 (200b or 200c) with a higher data transfer speed. Thus, the trouble of user's waiting time can be reduced while keeping as many functions of the image forming system 1 accompanied by the first data transfer and the second data transfer as possible even in the case where the data transfer speed between the controller 50 and the image forming apparatus 100 of a communication paths 200b and 200c is decreased.

(4) In (1) to (3) described above, in the case where a data communication path 200 (200b or 200c) with a high data transfer speed does not satisfy a requirement of data transfer speed for a data transfer with a high priority, the plurality of data communication paths 200b and 200c are assigned to the data transfer with a high priority. Thus, the trouble of user's waiting time can be reduced while keeping as many functions related to the data transfer with the high priority as possible.

(5) In (1) to (4) described above, in the case where the data transfer speed of each of the plurality of data communication paths does not reach a predetermined threshold value, a decrease in the data transfer speed is notified. Thus, it becomes possible for the user to inspect an error and the like in the data communication paths 200 (200b and 200c), and the trouble of user's waiting time can be reduced while keeping as many functions related to the data transfer as possible.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image formation control method for controlling an image forming system, the image forming system including
   a controller that converts original image data into image formation image data,
   an image forming apparatus that includes a control unit and an image forming unit and forms an image on a sheet on a basis of the image formation image data,
   a plurality of communication paths through which plural pieces of data are capable of being transferred in parallel between the controller and the image forming apparatus, wherein the image forming system is configured to transmit control data and image data through the communication paths; and
   a measurement unit that repeatedly measures data transfer speed of each of the plurality of communication paths, the image formation control method comprising
   causing the control unit to
     refer to the data transfer speed of each of the plurality of communication paths measured by the measurement unit,
     compare a first data transfer speed of a first communication path of the plurality of communication paths measured by the measurement unit to a second data transfer speed of second communication path of the plurality of communication paths measured by the measurement unit,
     determine which of the first data transfer speed and the second data transfer speed is faster, and
     assign a data transfer to one of the first communication path and the second communication path based upon the determination.

2. The image formation control method according to claim 1, wherein, in a case where an order of priority is determined for plural data transfers between the controller and the image forming apparatus and the plural data transfers are performed in parallel, the control unit assigns a data transfer with a higher priority to a communication path with a higher data transfer speed.

3. The image formation control method according to claim 1, wherein, in a case where an order of priority is determined for a first data transfer from the controller to the image forming apparatus and a second data transfer from the image forming apparatus to the controller and the first data transfer and the second data transfer are performed in parallel, the control unit assigns a data transfer with a higher priority to a communication path with a higher data transfer speed.

4. The image formation control method according to claim 1, wherein, in a case where a communication path with a high data transfer speed does not satisfy a requirement of data transfer speed for a data transfer with a high priority, the control unit assigns two or more of the plurality of communication paths to the data transfer with a high priority.

5. The image formation control method according to claim 1, wherein, in a case where the data transfer speed of a communication path measured by the measurement unit does not reach a predetermined threshold value, the control unit performs control to notify a decrease in the data transfer speed.

6. An image forming system comprising:
a controller that converts original image data into image formation image data;
an image forming apparatus that includes a control unit and an image forming unit and forms an image on a sheet on a basis of the image formation image data;
a plurality of communication paths through which plural pieces of data are capable of being transferred in parallel between the controller and the image forming apparatus; wherein the image forming system is configured to transmit control data and image data through the communication paths; and
a measurement unit that repeatedly measures data transfer speed of each of the plurality of communication paths, wherein
the control unit
refers to the data transfer speed of each of the plurality of communication paths measured by the measurement unit
compares a first data transfer speed of a first communication path of the plurality of communication paths measured by the measurement unit to a second data transfer speed of second communication path of the plurality of communication paths measured by the measurement unit,
determines which of the first data transfer speed and the second data transfer speed is faster, and
assigns a data transfer to one of the first communication path and the second communication path based upon the determination.

7. The image forming system according to claim 6, wherein, in a case where an order of priority is determined for plural data transfers between the controller and the image forming apparatus and the plural data transfers are performed in parallel, the control unit assigns a data transfer with a higher priority to a communication path with a higher data transfer speed.

8. The image forming system according to claim 6, wherein, in a case where an order of priority is determined for a first data transfer from the controller to the image forming apparatus and a second data transfer from the image forming apparatus to the controller and the first data transfer and the second data transfer are performed in parallel, the control unit assigns a data transfer with a higher priority to a communication path with a higher data transfer speed.

9. The image forming system according to claim 6, wherein, in a case where a communication path with a high data transfer speed does not satisfy a requirement of data transfer speed for a data transfer with a high priority, the control unit assigns two or more of the plurality of communication paths to the data transfer with a high priority.

10. The image forming system according to claim 6, wherein, in a case where the data transfer speed of a communication path measured by the measurement unit does not reach a predetermined threshold value, the control unit performs control to notify a decrease in the data transfer speed.

11. An image forming apparatus capable of being connected to an image forming system, the image forming system including
a controller that converts original image data into image formation image data,
an image forming apparatus that includes a control unit and an image forming unit and forms an image on a sheet on a basis of the image formation image data,
a plurality of communication paths through which plural pieces of data are capable of being transferred in parallel between the controller and the image forming apparatus, wherein the image forming system is configured to transmit control data and image data through the communication paths; and
a measurement unit that repeatedly measures data transfer speed of each of the plurality of communication paths, wherein
the control unit refers to the data transfer speed of each of the plurality of communication paths measured by the measurement unit compares a first data transfer speed of a first communication path of the plurality of communication paths measured by the measurement unit to a second data transfer speed of second communication path of the plurality of communication paths measured by the measurement unit,
determines which of the first data transfer speed and the second data transfer speed is faster, and
assigns a data transfer to one of the first communication path and the second communication path based upon the determination.

12. The image forming apparatus according to claim 11, wherein, in a case where an order of priority is determined for plural data transfers between the controller and the image forming apparatus and the plural data transfers are performed in parallel, the control unit assigns a data transfer with a higher priority to a communication path with a higher data transfer speed.

13. The image forming apparatus according to claim 11, wherein, in a case where an order of priority is determined for a first data transfer from the controller to the image forming apparatus and a second data transfer from the image forming apparatus to the controller and the first data transfer and the second data transfer are performed in parallel, the control unit assigns a data transfer with a higher priority to a communication path with a higher data transfer speed.

14. The image forming apparatus according to claim 11, wherein, in a case where a communication path with a high data transfer speed does not satisfy a requirement of data transfer speed for a data transfer with a high priority, the control unit assigns two or more of the plurality of communication paths to the data transfer with a high priority.

15. The image forming apparatus according to claim 11, wherein, in a case where the data transfer speed of a communication path measured by the measurement unit does not reach a predetermined threshold value, the control unit performs control to notify a decrease in the data transfer speed.

16. An image forming system comprising:
a first controller comprising
  a communication unit configured to transmit and receive data to and from an external device, and
  a converting unit configured to convert original image data received by the communication unit into image formation image data;
an image forming apparatus comprising
  a scanner configured to read a document image and generate read image data, and
  an image forming unit configured to form an image on a sheet based on the image formation image data;
a plurality of communication paths each having a function of transmitting the image formation image data from the first controller to the image forming apparatus or a function of transmitting the read image data from the image forming apparatus to the first controller, wherein the image forming system is configured to also transmit control data through the communication paths;
a measurement unit configured to detect a state of the communication paths;
a second controller configured to
  receive information regarding the state of the communication paths,
  compare a first state of a first communication path of the communications paths to a second state of a second communication path of the communication paths,
  assign the image formation image data and the read image data to the communication paths based on the comparison of the first state and the second state of the communication paths detected by the measurement unit, and
  employ communication between the first controller and the image forming apparatus.

17. The image forming system according to claim 16, wherein the measurement unit detects change of communication speed of each of the plurality of communication paths.

18. The image forming system according to claim 16, wherein the measurement unit repeatedly detects communication speed of each of the plurality of communication paths.

19. The image forming system according to claim 16, wherein (i) the measurement unit measures communication speed of each of the plurality of communication paths, and (ii) the second controller assigns the image formation image data and the read image data to the communication paths.

* * * * *